(12) United States Patent
Anderson et al.

(10) Patent No.: US 10,975,759 B2
(45) Date of Patent: Apr. 13, 2021

(54) SPARK PLUG FOR AN INTERNAL COMBUSTION ENGINE HAVING A COMBUSTION PRE-CHAMBER

(71) Applicant: Cummins Inc., Columbus, IN (US)

(72) Inventors: Alan C. Anderson, Columbus, IN (US); William Marshall Cover, Columbus, IN (US); Xu Han, Columbus, IN (US); Benjamin L. Olivas, Columbus, IN (US); Daniel J. O'Connor, Columbus, IN (US); Daniel Guillermo Gonzalez Medina, Columbus, IN (US); Xiao Qin, Columbus, IN (US); Nicholas James Welch, Columbus, IN (US); Andrew Guy Kitchen, Daventry (GB)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 16/434,270

(22) Filed: Jun. 7, 2019

(65) Prior Publication Data
US 2019/0284988 A1  Sep. 19, 2019

Related U.S. Application Data

(63) Continuation of application No. PCT/US2017/065123, filed on Dec. 7, 2017.
(Continued)

(51) Int. Cl.
*F02B 19/12* (2006.01)
*F02P 13/00* (2006.01)
(Continued)

(52) U.S. Cl.
CPC .............. *F02B 19/12* (2013.01); *F02B 19/10* (2013.01); *F02P 13/00* (2013.01); *H01T 13/06* (2013.01);
(Continued)

(58) Field of Classification Search
CPC F02B 19/12; F02B 19/10; F02P 13/00; H01T 13/54; H01T 21/02; H01T 13/467; H01T 13/06; H01T 13/14
See application file for complete search history.

(56) References Cited

U.S. PATENT DOCUMENTS

| 3,958,144 A | 5/1976 | Franks |
| 6,583,539 B1 | 6/2003 | Zamora |

(Continued)

FOREIGN PATENT DOCUMENTS

WO  2014/148847  9/2014

OTHER PUBLICATIONS

Search Report and Written Opinion, PCT Appln. No. PCT/US2017/065032, dated Feb. 9, 2018, 9 pgs.

*Primary Examiner* — Jacob M Amick
(74) *Attorney, Agent, or Firm* — Taft Stettinius & Hollister LLP

(57) ABSTRACT

A spark plug is disclosed that includes at least one bore extending through a shell of the spark plug in order to form a passageway between an annular volume around the spark plug insulator nose and a pre-chamber volume of a pre-chamber device, thus directing a purge of exhaust gases trapped in the annular volume to a space formed by the exterior of the spark plug body and the interior of the pre-chamber device.

18 Claims, 8 Drawing Sheets

Related U.S. Application Data

(60) Provisional application No. 62/431,867, filed on Dec. 9, 2016.

(51) Int. Cl.
    *H01T 13/54*     (2006.01)
    *H01T 13/46*     (2006.01)
    *H01T 13/06*     (2006.01)
    *H01T 21/02*     (2006.01)
    *F02B 19/10*     (2006.01)
    *H01T 13/14*     (2006.01)

(52) U.S. Cl.
    CPC ............ *H01T 13/14* (2013.01); *H01T 13/54* (2013.01); *H01T 21/02* (2013.01); *H01T 13/467* (2013.01)

(56) References Cited

U.S. PATENT DOCUMENTS

| | | |
|---|---|---|
| 8,853,926 B2 | 10/2014 | Morin |
| 9,225,151 B2 | 12/2015 | Douglas et al. |
| 2002/0055318 A1 | 5/2002 | Ishigoro et al. |
| 2011/0005478 A1 | 1/2011 | Taliaferro |
| 2013/0055986 A1 | 3/2013 | Tozzi et al. |
| 2013/0206101 A1* | 8/2013 | Douglas ................. F02B 19/12 123/260 |

* cited by examiner

SPARK PLUG FOR AN INTERNAL COMBUSTION ENGINE HAVING A COMBUSTION PRE-CHAMBER

CROSS-REFERENCE TO RELATED APPLICATION

The present application is a continuation of International Patent Application No. PCT/US17/65123 filed on Dec. 7, 2017, which claims the benefit of the filing date of Provisional App. Ser. No. 62/431,867 filed on Dec. 9, 2017, each of which is incorporated herein by reference.

TECHNICAL FIELD

The subject matter of this application relates generally to internal combustion engines, and more specifically to spark plugs used in ignition systems of internal combustion engines having combustion pre-chambers for the spark plugs.

BACKGROUND

It is well documented that the use of combustion pre-chamber devices with spark plugs, such as shown in FIG. 1, in pre-chamber assemblies in a spark ignited, natural gas fueled, engine can result in an extended lambda (air/fuel ratio) range. Generally this allows the engine to be operated leaner than an open chamber system, resulting in lower NOx emissions while maintaining good cycle-to-cycle peak cylinder pressure variation. With these engines there is usually an operational trade-off between NOx emissions and fuel consumption. For applications that have higher NOx emissions requirements than others, better fuel consumption can be obtained by running the pre-chamber engine slightly richer (i.e., at a lower lambda value). Depending on the cost of fuel, this operation at a lower lambda value can offer substantial savings to the engine owner/operator.

Spark plugs are used in conjunction with various types of combustion chamber configurations to initiate a flame in a flammable fuel and air mixture. Some combustion chamber configurations include passive pre-chamber, open chamber, and fuel fed pre-chamber configurations. Pre-chambers are useful for initiating and propagating the combustion flame for pre-mixed gaseous-fueled engines. In particular, pre-chambers provide benefits as applied in lean-burn natural gas engines which can be difficult to ignite using conventional open chamber type configurations.

Passive pre-chambers include a combustion volume in which the spark plug is located. The combustion volume of the pre-chamber is linked to the main combustion chamber of the cylinder by the use of orifices or nozzles. The spark plugs include a central cathode electrode and one or more outer ground or anode electrodes, which at least partially surround the cathode electrode to create a gap therebetween. The spark plug initiates a combustion event by generating a spark (e.g., an electron current) that spans the gap between the central cathode electrode and one or more outer ground electrodes. More specifically, the spark initiates a flame that propagates through the pre-chamber volume. This combustion creates a sudden increase in pressure in the pre-chamber creating a large pressure difference across the orifices between the pre-chamber and main chamber. The pressure difference forces the flame to propel through the orifices into the main combustion chamber resulting in a successful combustion event.

After a successful combustion event, the residual exhaust gases in the main chamber are scavenged during the exhaust stroke of the piston within the cylinder. During the intake stroke, a fresh, pre-mixed air and fuel mixture (charge) is pulled into the main cylinder via an expansion event driven by the piston. However, some residual exhaust gases in the passive pre-chamber volume and between the spark plug electrodes are not completely scavenged and remain within the pre-chamber during the exhaust and intake strokes. During the subsequent compression stroke, the pressure difference between the main chamber and pre-chamber increases, forcing a fresh charge through the orifices into the pre-chamber, which compresses the residual exhaust gases towards the backside of the pre-chamber where the spark plug is located. The residual exhaust gases trapped in the area toward the back side of the pre-chamber, on the side opposite to the main chamber, can lead to pre-ignition and/or abnormal combustion, especially when the engine is operating at richer lambda (air/fuel ratio) ranges.

Engine testing and analysis by the inventors have discovered that the residual gas trapped in the annular volume around the spark plug insulator nose is not readily purged in subsequent combustion cycles and as a result can be heated to a temperature sufficient to cause pre-ignition. This was found to be the case particularly when the engine is operated at richer lambda values. Output from fluid dynamics analyses shows low velocity in the spark plug annular volume nearest to the insulator nose at the rearmost portion of the pre-chamber volume. Output from $CO_2$ concentration analyses in a spark plug indicates evidence of unacceptably high levels of $CO_2$ residual gas remaining in the spark plug annular volume, particularly in zones near the base of the insulator nose. Output from temperature analyses measuring temperatures within various zones of the spark plug annular volume indicates evidence of high gas temperatures in the spark plug annular volume, especially near the base of the insulator nose, as a result of the lack of mixing or purging of the residual gas from the spark plug annular volume.

Improvements are needed in spark plugs to improve the purging of the residual gases in the annular spark plug volume and pre-chamber volume, thus extending the lambda operating range within which the engine may be advantageously operated.

SUMMARY

The subject matter of the present application has been developed in response to the present state of the art, and in particular, in response to the problems and needs in the spark plug and combustion pre-chamber art that have not yet been fully solved by currently available combustion pre-chamber and spark plug designs.

According to one embodiment as described herein, a spark plug is disclosed for use in a combustion pre-chamber assembly in a lean-burn, gaseous fueled, internal combustion engine includes at least one bore extending through a shell of a spark plug positioned to form a passageway between an annular volume around the spark plug insulator nose and a pre-chamber volume of a pre-chamber device, thus directing a purge of exhaust gases trapped in the annular volume to a space formed by the exterior of the spark plug body and the interior of the pre-chamber device.

This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

BRIEF DESCRIPTION OF THE DRAWINGS

In order that the advantages of the subject matter may be more readily understood, a more particular description of the subject matter briefly described above will be rendered by reference to certain embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

There is disclosed herein improved spark plug designs to allow for improved flow of fresh charge into the annular volume around the spark plug insulator. The improvements result in improved flow of fresh charge mix into the annular volume around the spark plug insulator, which dilutes or purges the residual gasses that are present from the previous cycle and delaying the onset of pre-ignition. The improvements have the effects of lowering the gas temperature in the annular volume, thus making the spark plug more resistant to pre-ignition and/or abnormal combustion. The improvements also result in extension of lambda (air/fuel ratio) operating range of engine, the pre-chamber, and/or the spark plug as used therein.

Figure 1:
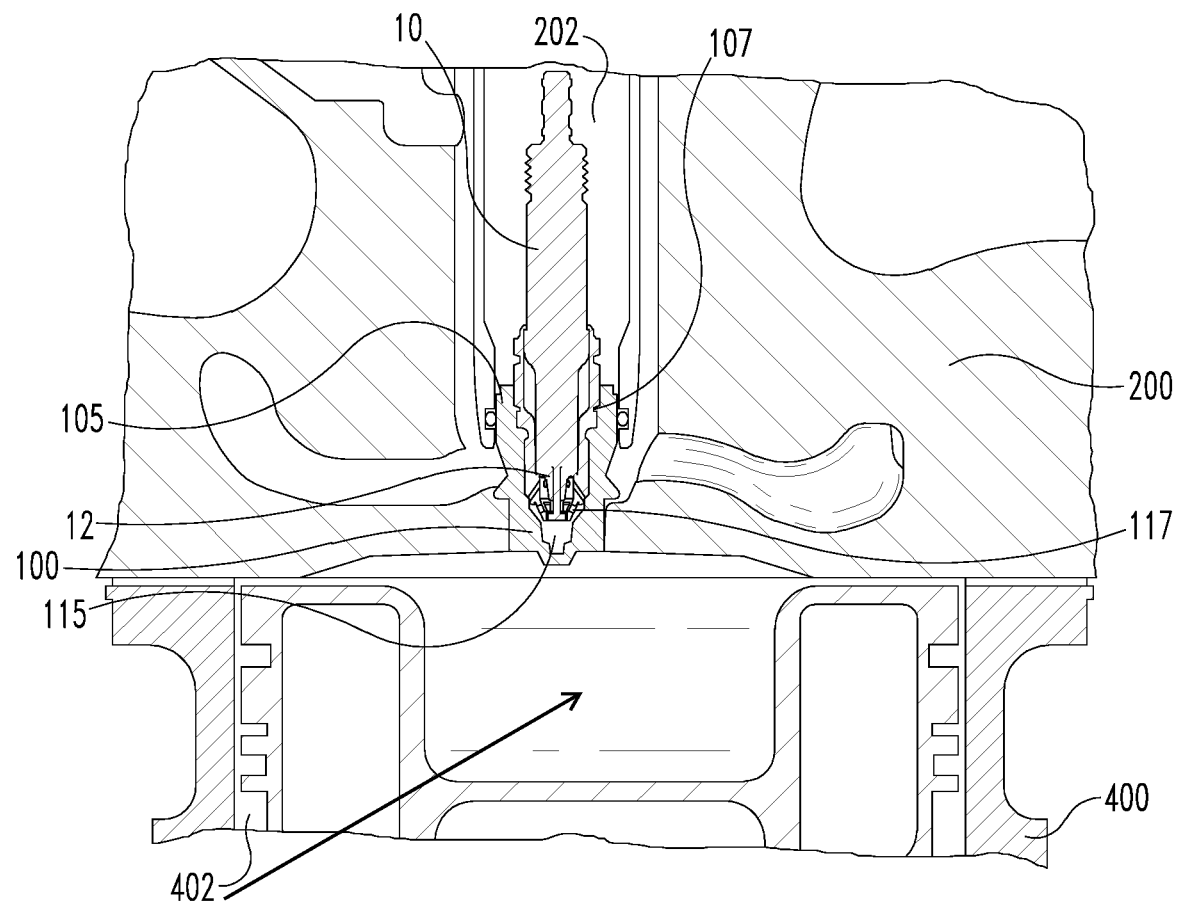
FIG. 1 is a cross-sectional side view of a typical pre-chamber assembly installed in a cylinder head.

FIG. 1 shows a cross-sectional side view of an example prior art passive pre-chamber assembly mounted directly to the cylinder head 200 of an internal combustion engine. The cylinder head 200 of conventional internal combustion engines includes a plurality of spark plug recesses 202 for receiving a spark plug 10. Typically, the conventional spark plug is fitted within a respective recess 202 such that all or part of the cathode and anode electrodes of the conventional spark plug are positioned within (e.g., directly exposed to) a respective main combustion chamber 402 of the engine or cylinder block when the cylinder head 200 is mounted to the cylinder liner 400 that is supported in the engine block. The recess 202 is fluidly coupled to an air-fuel mixture inlet for receiving an air-fuel mixture from air intake and fuel sources (not shown).

As shown in FIG. 1, a conventional spark plug may be connected with a passive pre-chamber device 100, which is fitted within the spark plug recess 202. The pre-chamber device 100 includes a body 105 that defines a pre-chamber volume 115. The pre-chamber volume 115 effectively spatially separates the spark plug (e.g., spark plug 10) from the main combustion chamber 402. The body 105 includes one or more orifices or nozzles in its distal end wall that fluidly connect the pre-chamber volume 115 with the main combustion chamber 402. As discussed above, the pre-chamber volume 115 facilitates the initiation and propagation of a combustion flame for the internal combustion engine. The body 105 may include connectors (e.g., external threads) matching or similar in dimensions the connectors (e.g., external threads) that are found on conventional spark plugs. The connectors of the body 105 mate with corresponding connectors (e.g., internal threads) formed within the spark plug recess 202 to secure the pre-chamber device 100 to the cylinder head 200. The body 105 includes a receptacle 107 configured to receive and retain a spark plug 10 within the body 105 such that the cathode and anode electrodes of the spark plug 10 are positioned within the pre-chamber volume 115.

The body 105 includes pre-chamber inlet apertures (not shown) for receiving the air-fuel mixture from the inlet of the cylinder head 200 into the pre-chamber volume 115. The pre-chamber volume 115 is in fluid communication with a gap 117 which is in the form of an annular space between the exterior surface of the spark plug 10 and the inner surface of the pre-chamber volume 115, the gap 117 being positioned toward a proximal portion of an electrode end portion of the spark plug 10.

Figure 2:
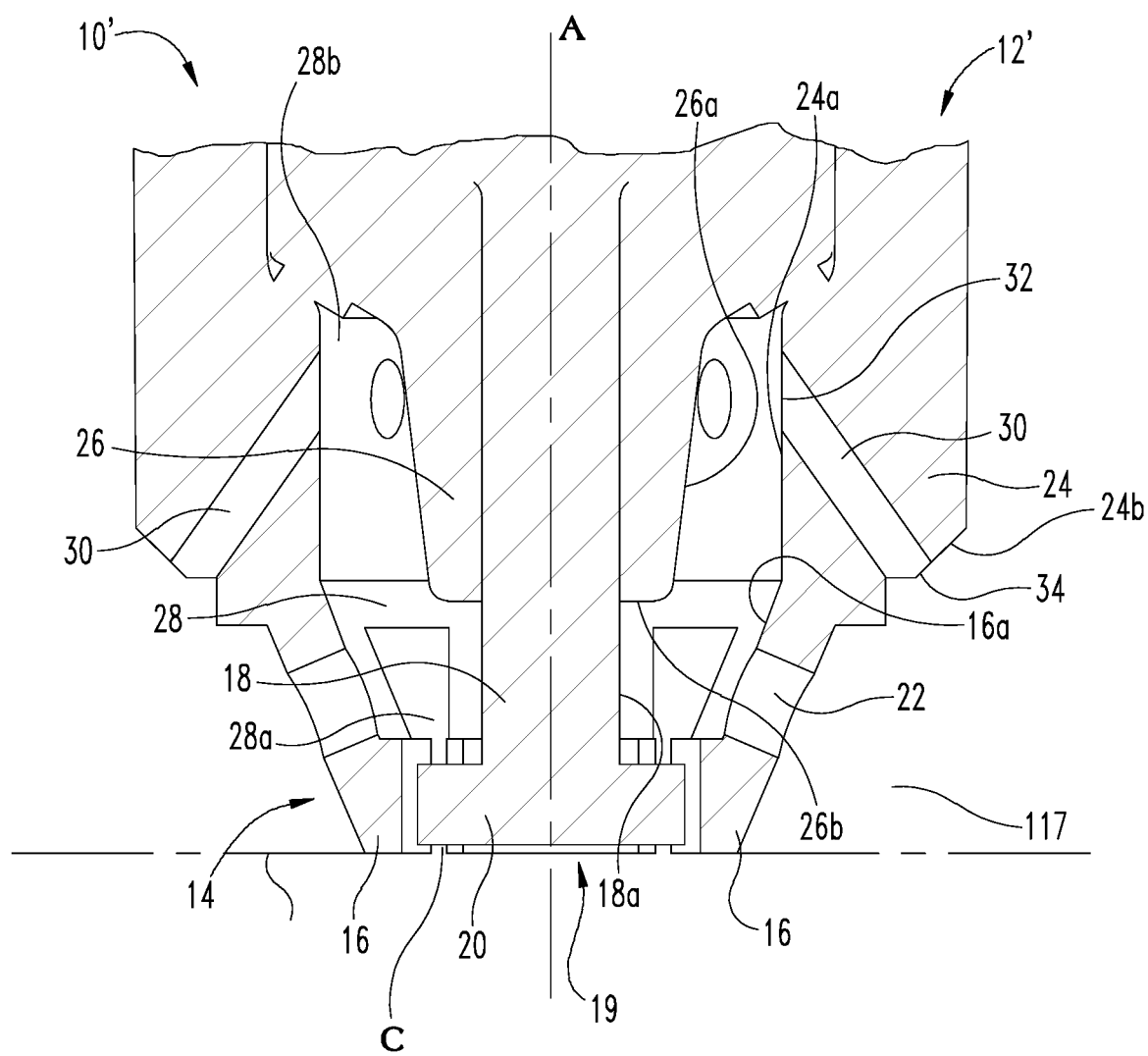
FIG. 2 is a cross-sectional side view of an electrode end portion of a spark plug of an embodiment.

FIG. 2 is a cross-sectional side view of an electrode end portion 12' of a spark plug 10' according to the present disclosure which is modified from the prior art spark plug 10. The spark plug 10' according to one embodiment includes an outer ground electrode portion 14 with a plurality of outer ground electrodes 16. The outer ground electrodes 16 can be defined as outer anodes or anode electrodes. Further, the spark plug 10' includes a central cathode electrode 18 about which the outer ground electrodes 16 are positioned at a distal end 19 of the spark plug 10'.

Generally, the outer electrodes 16 at least partially laterally surround or are positioned laterally about the central electrode 18. In other words, the outer electrodes 16 are radially outwardly spaced-apart from the central electrode 18, defining a space or gap between the central cathode electrode 18 and the outer electrodes 16. The outer electrodes 16 extend from a proximal portion to the distal end 19 of the spark plug 10', adjacent a head 20 of the central electrode 18. In certain implementations, the outer electrodes 16 are angled radially inwardly toward a central longitudinal axis A of the spark plug 10' in a proximal to distal direction as shown in FIG. 2. In certain implementations, the outer electrodes 16 each include an aperture 22 that facilitates the flow of fresh charge and exhaust gas into and out of the space defined between the central cathode electrode 18 and the outer electrodes 16.

The spark plug 10' includes an outer shell 24 that surrounds the body of the spark plug 10', formed generally in a cylindrical shape at a proximal portion of the electrode end portion 14 of the spark plug 10' as shown in FIG. 2. The shell 24 ends at the proximal portion of the electrode end portion 14 such that the ground electrodes 16 are open to the pre-chamber volume 115. The spark plug 10' further includes an insulator including an insulator nose 26. The insulator nose 26 surrounds the central electrode 18 and generally is formed in the shape of a hollow tube surrounding the central electrode 18 and positioned to be concentric to the cylindrical shape of the body of the central electrode 18.

The inner surfaces of the preceding structures form a space within the spark plug 10' that is generally annular in shape. Specifically, as shown in FIG. 2, inner surface 16a of the ground electrodes 16, inner surface 24a of the shell 24, surface 26a of the insulator nose 26, and surface 18a of the central electrode 18 together form a boundary around an interior annular volume 28 that extends around insulator nose 26 inside the electrode end portion 12 of the spark plug 10'. The gap 28 includes a front gap portion 28a formed near the distal end 19 of the spark plug 10'. The gap 28 further includes a rear gap portion 28b formed near the proximal portion of the electrode end portion 12 of the spark plug 10'. The rear gap portion 28b forms an annular space surrounding the proximal portion of the insulator nose 26.

Although the spark plug 10' illustrated herein includes a circular central electrode and a plurality of spaced-apart concentric outer electrodes, in some embodiments, the spark plugs can include different shaped central electrodes with fewer or more than the depicted number of outer electrodes. Also, the outer electrodes may be formed in a number of different known shapes. For example, in one embodiment, a spark plug includes a single outer electrode that surrounds the central electrode, and in another embodiment a spark plug includes a single square central electrode with four concentric outer electrodes.

As shown in the spark plug 10' in FIG. 2, in an embodiment, an aperture in the form of bore 30 such as a drilled hole is formed in the shell 24. In an embodiment, the bore 30 is in the form of a hollow, cylindrically-shaped aperture formed in the shell 24 by drilling. The bore 30 extends in a direction that is at an oblique angle relative to the central longitudinal axis A of the spark plug 10'. The bore 30 extends between an inner end 32 of the bore 30, positioned along the inner surface 24a of the shell 24, and an outer end 34 of the bore 30, positioned along the outer surface 24b of the shell 24.

Figure 3:
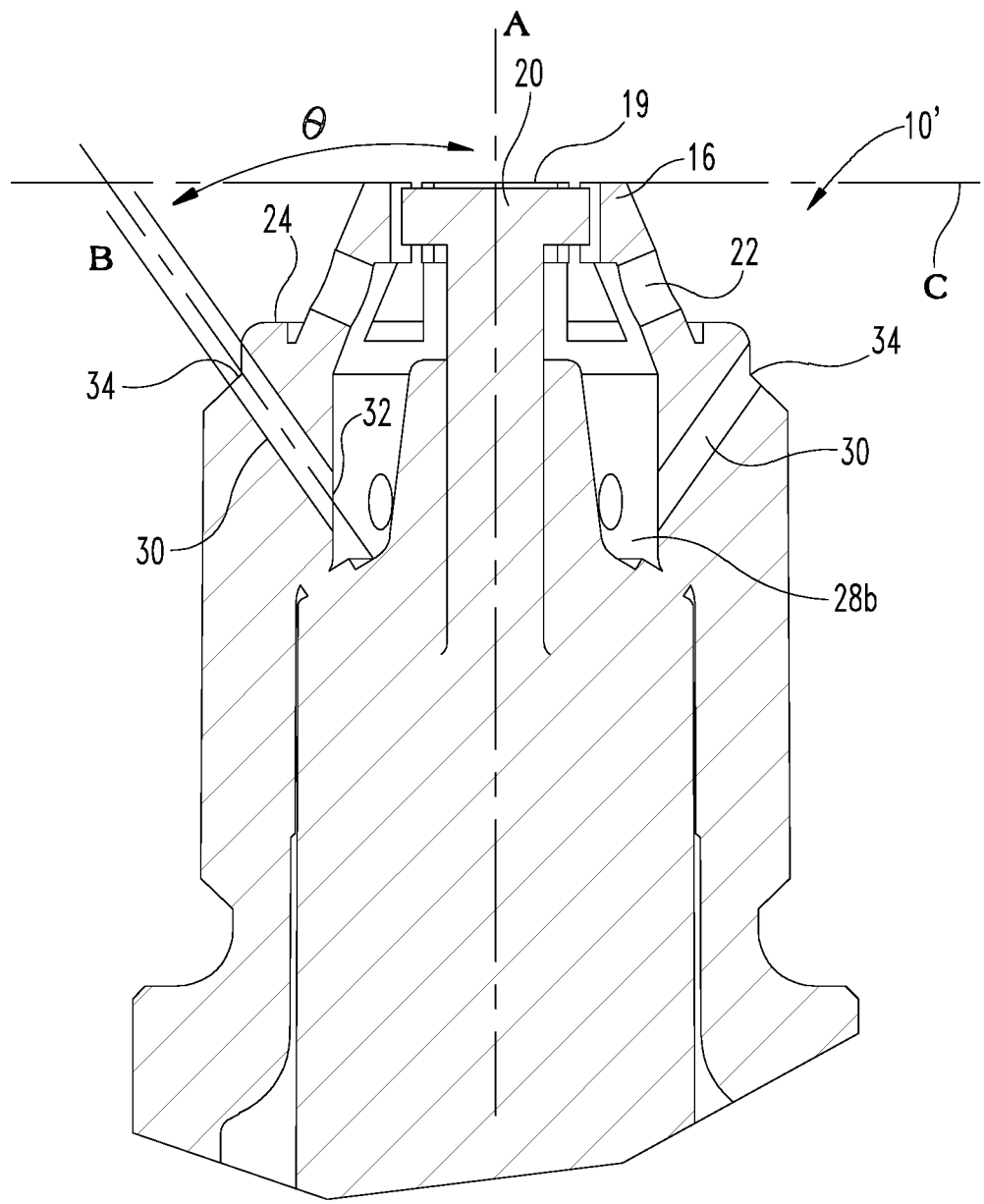
FIG. 3 is another cross-sectional side view of an electrode end portion of a spark plug of an embodiment.

The angle at which the bore 30 extends relative to the central longitudinal axis A may vary as appropriate to the geometric shape of the spark plug 10' in the region of the insulator nose 26. In an embodiment as depicted in FIG. 3, the bore 30 extends in a direction wherein a central longitudinal axis B of the bore 30 is at an oblique angle θ relative to the direction of the central longitudinal axis A. In the illustrated embodiment, longitudinal axis B intersects longitudinal axis A in the proximal direction and diverges from longitudinal A in the distal direction. The extension of the bore 30 in the oblique angular direction directs movement of exhaust gases trapped in the annular region 28b and/or annular volume 28 toward the gap 117. Formed to extend at such an oblique angle θ, the bore 30 forms a passageway directed so as to aid the expulsion of the exhaust gasses trapped in the annular region 28b and/or annular volume 28 outwardly through the bore 30 into the gap 117, and in turn, into the pre-chamber volume 115 to which the gap 117 is in fluid connection.

As seen in FIGS. 2 and 3, in an embodiment, the inner end 32 of the bore 30 is located at a position that is at a greater distance from the distal end 19 of the spark plug 10 than the position of the outer end 34 of the bore 30. In an embodiment, the inner end 32 of the bore 30 is located at a position such that the distance between the inner end 32 and the distal end 19 of the spark plug 10 is greater than the distance between the distal end 26b of the insulator nose 26 and the distal end 19 of the spark plug 10. In such an arrangement, the inner end 32 is positioned to aid the expulsion of the exhaust gases left over from the previous combustion event out of the rearmost portion of the annular region 28b outwardly through the bore 30 into the gap 117. In such a position, the inner end 32 is positioned to aid such purge of exhaust gases in a manner that is not accomplished by prior art features such as apertures 22 formed in ground electrodes 16, which are not positioned in the rearmost portion of the annular region 28b, as may be seen from the configuration shown in FIG. 2. In this manner, the annular region 28b and the adjacent annular volume 28 are substantially purged of residual exhaust gas and the region 28b and annular volume 28 are more effectively replenished with fresh air/fuel mixture at the time of spark ignition (e.g., generally between 20-degrees and 16-degrees before top dead center (BTDC).

Figure 4:
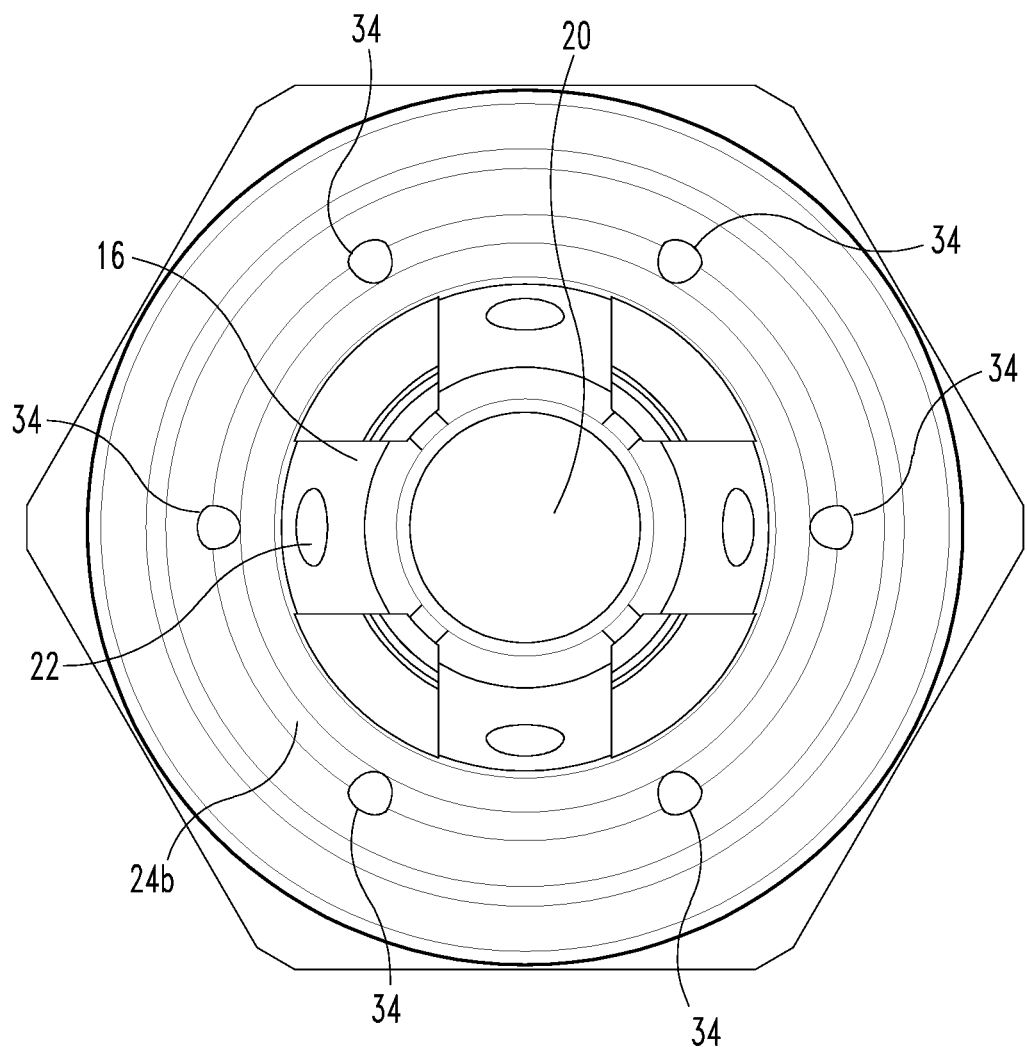
FIG. 4 is an end elevation view of an electrode end of a spark plug of an embodiment.

FIG. 4 is an end elevation view taken from the side of the distal end 19 of a spark plug 10' of one embodiment. Outer ends 34 of a plurality of the bores 30 (six bores 30, as depicted in FIG. 4) are formed in the outer surface 24b of shell 24. Bores 30 diverge from one another in the distal direction toward distal end 19. The plurality of bores 30 are space equidistantly from one another around longitudinal axis A.

Figure 5:
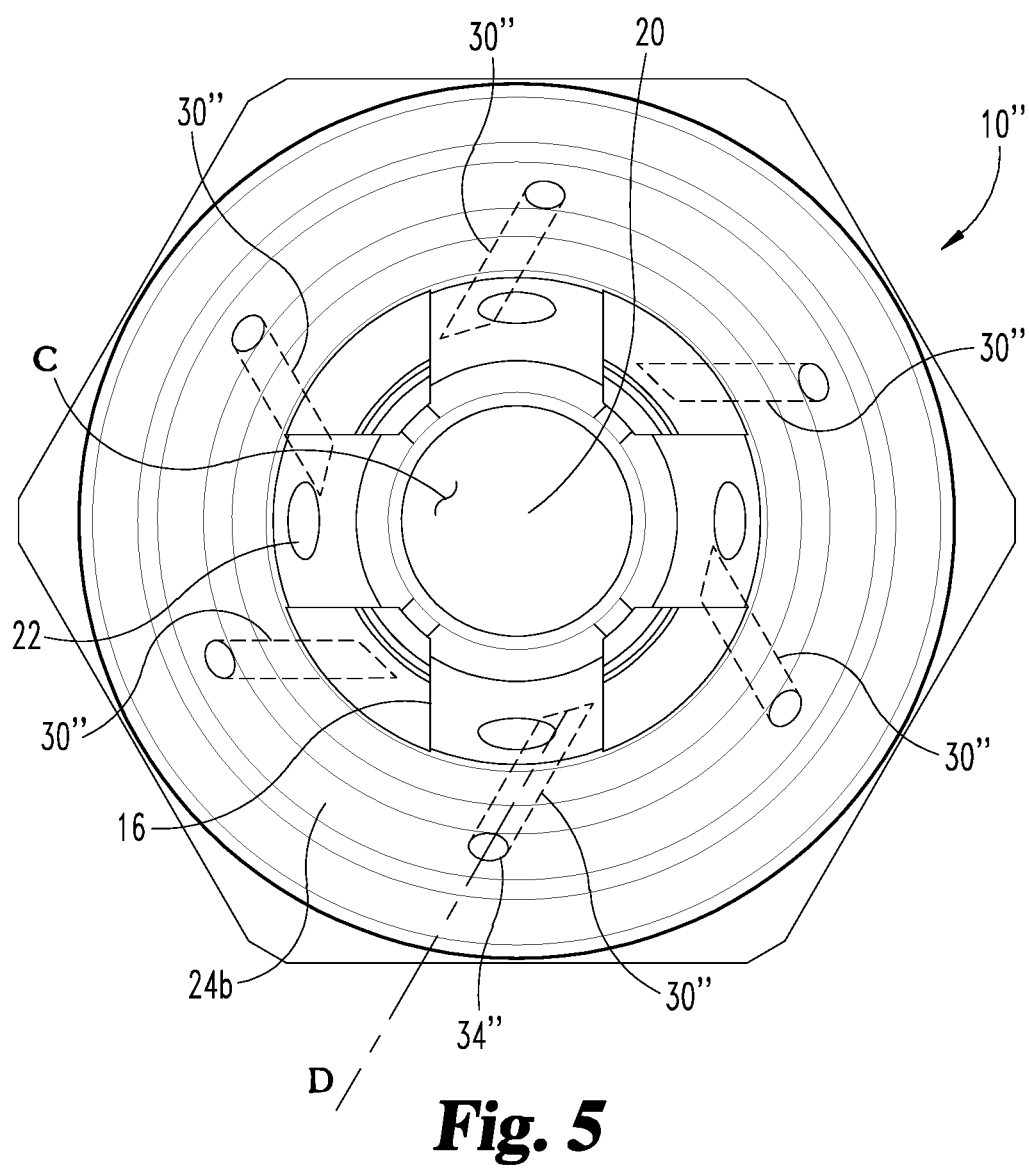
FIG. 5 is an end elevation view of an electrode end of a spark plug shown transparently with an embodiment of bores arranged to induce a swirl feature.

FIG. 5 is an end elevation view taken from the side of the distal end 19 of another embodiment spark plug 10" similar to spark plug 10' except the bores 30" in spark plug 10" are formed at a tangential angle to impart a swirl characteristic to exhaust gases exiting the bores 30" through outer ends 34". For example, line D represents the longitudinal axis of the bore 30" having the outer end 34" depicted in FIG. 5. The longitudinal axis D extends in a direction tangential to a point on the circumference of a circle defined by head 20, where the circle lies in a plane C and has a center point on central longitudinal axis A, and the plane C is perpendicular to the central longitudinal axis A of the spark plug (see FIG. 3). Therefore, the bores 30" do not intersect longitudinal axis A in this embodiment. That is to say, the exhaust gases exiting bores 30" through outer end 34" will be directed in a tangential or swirling direction with respect to central longitudinal axis A. In this manner, a swirl characteristic is imparted to the exiting gases as they enter into and circulate within gap 117 and pre-chamber volume 115. The swirl may be imparted at different radial angles with respect to central longitudinal axis A. The swirl may be imparted in counterclockwise and/or clockwise directions.

Figure 6:
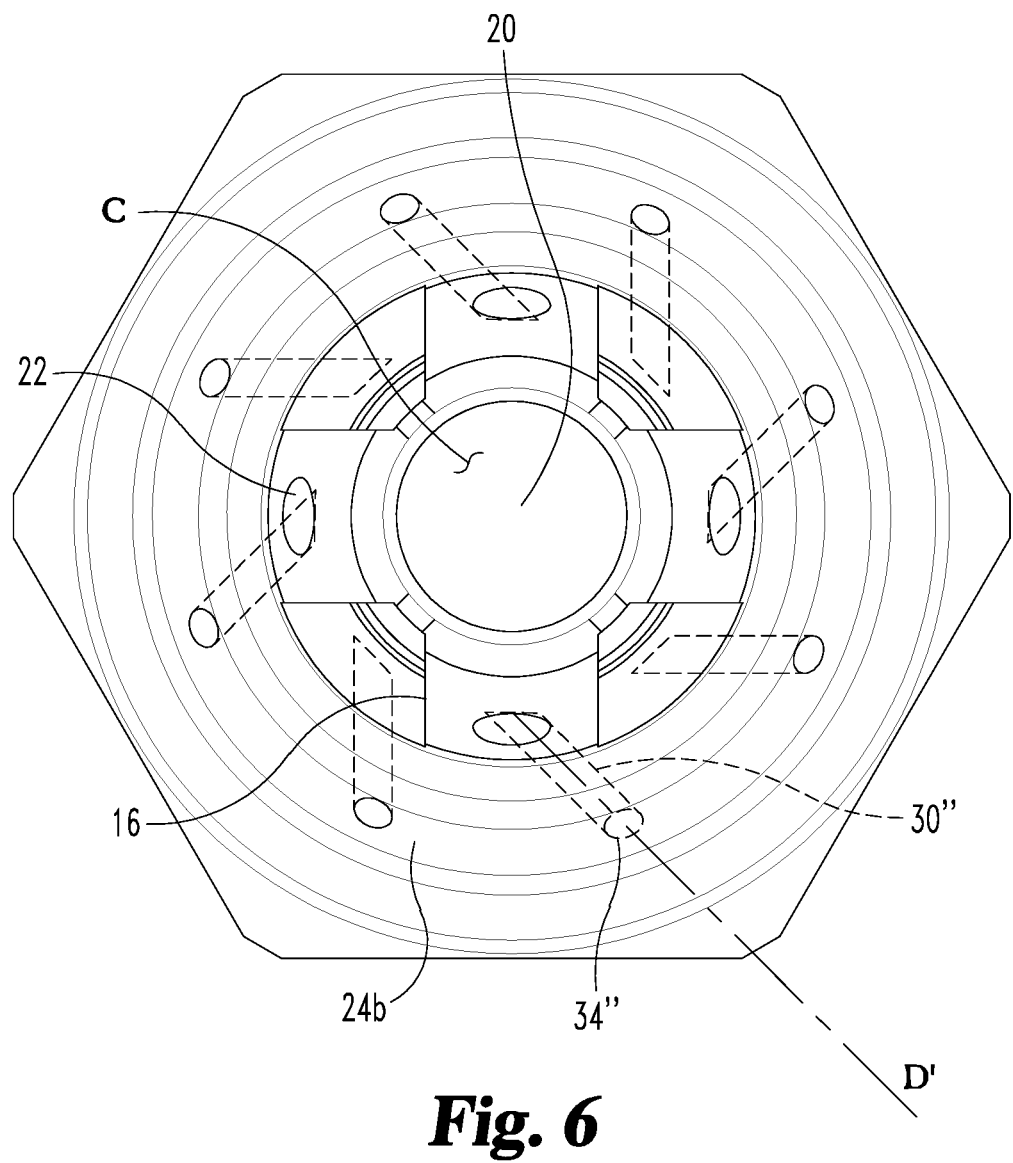
FIG. 6 is another end elevation view of an electrode end of a spark plug shown transparently with another embodiment of bores arranged to induce a swirl feature.

As shown in FIG. 6, in another embodiment the angle of longitudinal axis D' may be selected such that the exhaust gases exiting bore 30" through outer end 34" will be directed in a tangential direction with respect to central longitudinal axis A, so as to be directed toward an aperture 22 in an adjacent ground electrode 16. This feature may aid circulation of exhaust gases in the front gap portion 28a of gap 28. The configuration of FIG. 6 also shows an embodiment having a larger number of bores 30" as compared to the configuration of FIG. 5, i.e. eight bores versus six bores.

Figure 7:
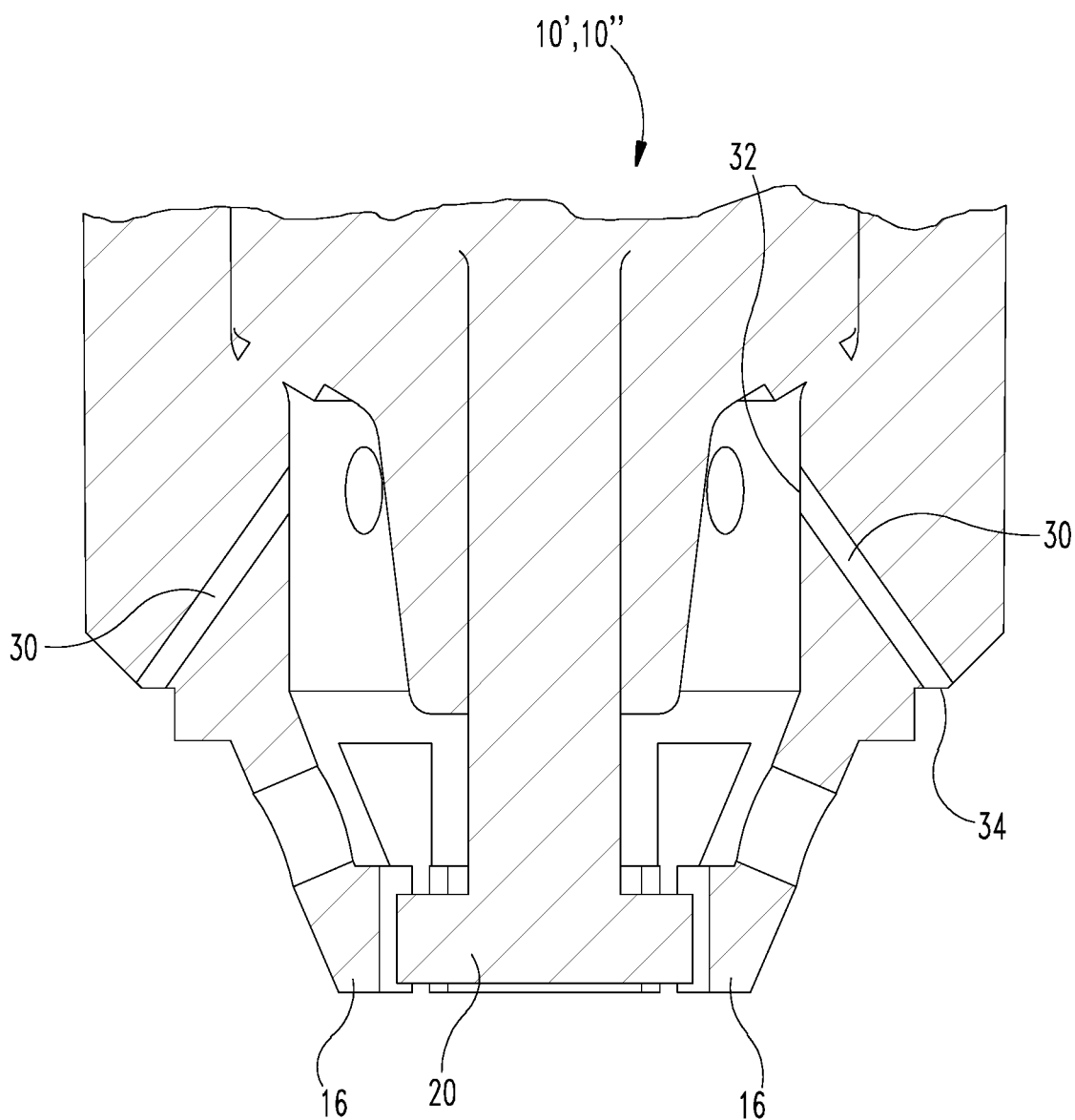
FIG. 7 is a cross-sectional side view of an electrode end portion of a spark plug of an embodiment having bores of smaller diameter.
Figure 8:
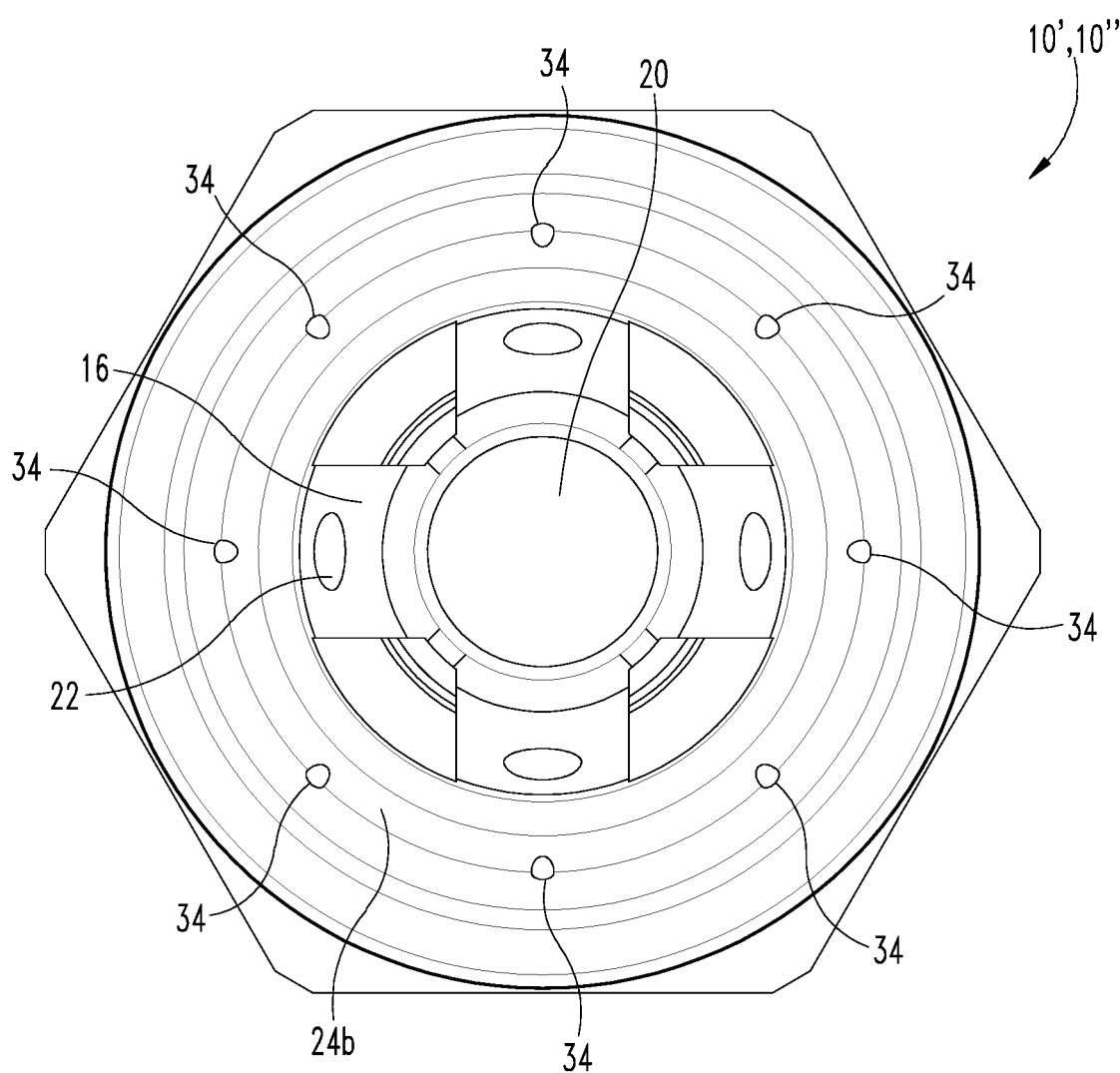
FIG. 8 is an end elevation view of an electrode end of a spark plug of an embodiment having bores of a smaller diameter.

The diameters of the bores 30 may vary in accord with the configuration of the spark plug 10', 10" in question and the operating conditions for which it is developed. For example, FIG. 7 shows a cross-sectional side view of an electrode end portion 12' of a spark plug 10', 10" that is similar in general to the configuration shown in FIG. 2, except that the bores 30 of the FIG. 7 configuration have smaller diameters than the bores depicted in FIG. 2. FIG. 8 shows an end view of the distal end 19 of a spark plug 10', 10" of an embodiment wherein the bores 30 are formed with smaller diameters such as shown as in the configuration of FIG. 7.

Applying the configurations shown in FIGS. 2-8, the bores 30, 30" are positioned to communicate between the rear or proximal portion 28b of the annular volume 28 so that fresh air/fuel charge present at the outer ends 34, 34" of the bores 30, 30" enters the outer ends 34, 34" and flows through the bores 30, 30", resulting in dilution and/or purging of the residual charge from the annular volume 28 around the spark plug insulator nose 26. This dilution and/or purging effectively lowers the gas temperature in the annular volume, thus preventing pre-ignition and/or abnormal combustion. As exemplified in the drawing figures, the numbers of, diameters of, and orientations of the bores 30, 30" may be adjusted to produce the desired performance results. The range of lambda values at which the engine may be operated increases, with less instances of pre-ignition and/or abnormal combustion. The passages may be placed at an angle so as to induce some amount of clockwise or counterclockwise swirl in gases exiting either of the ends of the bores 30, 30".

As is evident from the figures and text presented above, a variety of aspects of the present disclosure are contemplated. According to one aspect, a spark plug for an internal combustion engine is provided. The spark plug includes a distal end portion with a center cathode electrode and at least one ground electrode. The spark plug also includes an insulator nose extending around the center cathode electrode, the insulator nose having a distal end that is spaced proximally from a distal end of the center cathode electrode. A shell extends around a body of the spark plug, and the shell defining an annular volume around the insulator nose. At least one bore extends through the shell between an inner end that opens into the annular volume and an outer end that opens on an outer side of the shell.

In one embodiment, the inner end of the bore is located such that a distance between the inner end of the bore and the distal end of the center cathode electrode is greater than a distance between the distal end of the insulator nose and the distal end of the center cathode electrode. In another embodiment, the at least one ground electrode includes at least four ground electrodes that surround the center cathode electrode.

In yet another embodiment, the body of the spark plug extends along a central longitudinal axis and the at least one bore extends along a bore axis that is angled relative to the central longitudinal axis so the at least one bore diverges from the central longitudinal axis in a distal direction. In a refinement of this embodiment, the bore axis of the at least one bore intersects the central longitudinal axis. In another refinement, the bore axis of the at least one bore is oriented to the central longitudinal axis so as to impart a swirl characteristic to a flow through the at least one bore. In a further refinement, the swirl characteristic is a clockwise swirl characteristic. In another refinement, the swirl characteristic is a counterclockwise swirl characteristic. In still another refinement, when viewed toward the distal end of the center cathode electrode, the bore axis is tangential to a circle defined by the distal end of the center cathode electrode.

In another embodiment, the at least one bore includes at least four bores. In yet another embodiment, the at least one bore is eight bores. In a further embodiment, the at least one bore includes a plurality of bores that are spaced equidistantly around the shell.

According to another aspect, a method includes installing a spark plug in an inner passage of a combustion pre-chamber assembly, where the combustion pre-chamber assembly includes a first end defining the inner passage and a second end defining a combustion pre-chamber. The spark plug includes a distal end portion with a center cathode electrode and at least one ground electrode, and an insulator nose extending around the center cathode electrode. The insulator nose has a distal end that is spaced proximally from a distal end of the center cathode electrode. The spark plug also includes a shell extending around a body of the spark plug that defines an annular volume around the insulator nose. At least one bore extends through the shell between an inner end of the at least one bore that opens into the annular volume and an outer end of the at least one bore that opens on an outer side of the shell.

In one embodiment, the at least one bore includes a plurality of bores. In another embodiment, the outer end of the at least one bore opens into the combustion pre-chamber of the combustion pre-chamber assembly. In yet another embodiment, the inner end of the bore is located such that a distance between the inner end of the bore and the distal end of the center cathode electrode is greater than a distance between the distal end of the insulator nose and the distal end of the center cathode electrode.

According to another aspect a method of manufacturing a spark plug is provided. The method includes forming a bore through a shell of the spark plug so the bore extends through the shell between an inner end of the bore that opens into an annular volume of the spark plug and an outer end of the bore that opens on an outer side of the shell. The spark plug includes a distal end portion with a center cathode electrode and at least one ground electrode. The spark plug also includes an insulator nose extending around the center cathode electrode. The insulator nose has a distal end that is spaced proximally from a distal end of the center cathode electrode, and the shell extends around a body of the spark plug to define the annular volume around the insulator nose.

In one embodiment, the bore is formed by drilling through the shell so that the inner end of the bore opens into a proximal portion of the annular volume that is located around the insulator nose. The center cathode electrode extends distally from the distal end of the insulator nose and the at least one ground electrode extends distally from a distal end of the shell.

In another embodiment, forming the bore includes orienting the bore at an angle to a central longitudinal axis of the body of the spark plug so that the bore diverges from the central longitudinal axis in a distal direction. In a refinement of this embodiment forming the bore includes orienting the bore relative to the longitudinal axis so that a swirl characteristic is imparted to flow through the bore into the annular volume.

In the above description, certain relative terms may be used such as "up," "down," "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object.

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In some instances, the benefit of simplicity may provide operational and economic benefits and exclusion of certain elements described herein is contemplated as within the scope of the invention herein by the inventors to achieve such benefits. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

The present subject matter may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A spark plug for an internal combustion engine, comprising:
    a distal end portion comprising a center cathode electrode and at least one ground electrode radially outward of the center cathode electrode, wherein the at least one ground electrode extends along a longitudinal axis from a proximal portion thereof to a distal end of the spark plug;
    an insulator nose extending around the center cathode electrode, the insulator nose having a distal end that is spaced proximally from a distal end of the center cathode electrode;
    a shell extending around a body of the spark plug, the shell defining an annular volume having a proximal portion around the insulator nose and a distal portion around the center cathode electrode;
    an aperture through the at least one ground electrode that opens into the distal portion of the annular volume; and
    at least one bore extending through the shell, wherein the at least one bore extends between an inner end that opens into the proximal portion of the annular volume at a location that is proximal of the aperture through the at least one ground electrode and the at least one bore includes an outer end that is positioned on and opens on an outer side of the shell.

2. The spark plug of claim 1, wherein the inner end of the bore is located such that a distance between the inner end of the bore and the distal end of the center cathode electrode is greater than a distance between the distal end of the insulator nose and the distal end of the center cathode electrode.

3. The spark plug of claim 1, wherein the at least one ground electrode includes at least four ground electrodes that surround the center cathode electrode.

4. The spark plug of claim 1, wherein the body of the spark plug extends along a central longitudinal axis and the at least one bore extends along a bore axis that is angled relative to the central longitudinal axis so the at least one bore diverges from the central longitudinal axis in a distal direction.

5. The spark plug of claim 4, wherein the bore axis of the at least one bore intersects the central longitudinal axis.

6. The spark plug of claim 4, wherein the bore axis of the at least one bore is oriented to the central longitudinal axis so as to impart a swirl characteristic to a flow through the at least one bore.

7. The spark plug of claim 6, wherein the swirl characteristic is a clockwise swirl characteristic.

8. The spark plug of claim 6, wherein the swirl characteristic is a counterclockwise swirl characteristic.

9. The spark plug of claim 6, wherein, when viewed toward the distal end of the center cathode electrode, the bore axis is tangential to a circle defined by the distal end of the center cathode electrode.

10. The spark plug of claim 1, wherein the at least one bore includes at least four bores.

11. The spark plug of claim 1, wherein the at least one bore is eight bores.

12. The spark plug of claim 1, wherein the at least one bore includes a plurality of bores that are spaced equidistantly around the shell.

13. A method, comprising:
    installing a spark plug in an inner passage of a combustion pre-chamber assembly, the combustion pre-chamber assembly including a first end defining the inner passage and a second end defining a combustion pre-chamber,
    wherein the spark plug comprises:
        a distal end portion comprising a center cathode electrode and at least one ground electrode radially outward of the center cathode electrode, wherein the at least one ground electrode extends along a longitudinal axis from a proximal portion thereof to a distal end of the spark plug;
        an insulator nose extending around the center cathode electrode, the insulator nose having a distal end that is spaced proximally from a distal end of the center cathode electrode;
        a shell extending around a body of the spark plug, the shell defining an annular volume having a proximal portion around the insulator nose and a distal portion around the center cathode electrode;
        an aperture through the at least one ground electrode that opens into the distal portion of the annular volume; and
        at least one bore extending through the shell, wherein the at least one bore extends between an inner end of the at least one bore that opens into the proximal portion of the annular volume at a location that is proximal of the aperture through the at least one ground electrode and the at least one bore includes an outer end that is positioned on and opens on an outer side of the shell.

14. The method of claim 13, wherein the at least one bore includes a plurality of bores.

15. The method of claim 13, wherein the outer end of the at least one bore opens into the combustion pre-chamber of the combustion pre-chamber assembly.

16. The method of claim 13, wherein the inner end of the bore is located such that a distance between the inner end of the bore and the distal end of the center cathode electrode is greater than a distance between the distal end of the insulator nose and the distal end of the center cathode electrode.

17. A method of manufacturing a spark plug, comprising:
forming a bore through a shell of the spark plug so the bore extends through the shell between an inner end of the bore that opens into an annular volume of the spark plug and an outer end of the bore that opens on an outer side of the shell, wherein the spark plug includes a distal end portion comprising a center cathode electrode and at least one ground electrode radially outward of the center cathode electrode with the at least one ground electrode including an aperture opening into the annular volume distally of the bore, the spark plug also including an insulator nose extending around the center cathode electrode, the insulator nose having a distal end that is spaced proximally from a distal end of the center cathode electrode, and the shell extends around a body of the spark plug to define the annular volume around the insulator nose, wherein forming the bore includes orienting the bore at an angle to a central longitudinal axis of the body of the spark plug so that the bore diverges from the central longitudinal axis in a distal direction and a swirl characteristic is imparted to flow through the bore into the annular volume.

18. The method of claim 17, wherein the bore is formed by drilling through the shell so that the inner end of the bore opens into a proximal portion of the annular volume that is located around the insulator nose, wherein the center cathode electrode extends distally from the distal end of the insulator nose and the at least one ground electrode extends distally from a distal end of the shell.

* * * * *

UNITED STATES PATENT AND TRADEMARK OFFICE
CERTIFICATE OF CORRECTION

PATENT NO. : 10,975,759 B2
APPLICATION NO. : 16/434270
DATED : April 13, 2021
INVENTOR(S) : Alan C. Anderson et al.

Page 1 of 1

It is certified that error appears in the above-identified patent and that said Letters Patent is hereby corrected as shown below:

On the Title Page

The named inventor Daniel Guillermo Gonzalez Medina should be David Guillermo Gonzalez Medina.

Signed and Sealed this
Twenty-first Day of September, 2021

Drew Hirshfeld
*Performing the Functions and Duties of the
Under Secretary of Commerce for Intellectual Property and
Director of the United States Patent and Trademark Office*